United States Patent
Stamm Masias

US011185848B2

(10) Patent No.: US 11,185,848 B2
(45) Date of Patent: Nov. 30, 2021

(54) PEROVSKITES OXYGEN STORAGE AND RELEASE MATERIALS AND THEIR USE FOR EXHAUST GAS TREATMENT

(71) Applicant: Toyota Motor Engineering & Manufacturing North America, Inc., Plano, TX (US)

(72) Inventor: Kimber L. Stamm Masias, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/894,097

(22) Filed: Jun. 5, 2020

(65) Prior Publication Data
US 2021/0237039 A1 Aug. 5, 2021

Related U.S. Application Data

(60) Provisional application No. 62/969,463, filed on Feb. 3, 2020.

(51) Int. Cl.
*B01J 23/83* (2006.01)
*B01J 23/34* (2006.01)
(Continued)

(52) U.S. Cl.
CPC .......... *B01J 23/83* (2013.01); *B01D 53/945* (2013.01); *B01J 23/34* (2013.01); *B01J 23/42* (2013.01);
(Continued)

(58) Field of Classification Search
CPC .............. B01D 53/9445; B01D 53/945; B01D 2255/102; B01D 2255/402;
(Continued)

(56) References Cited

U.S. PATENT DOCUMENTS

| 6,060,420 A * | 5/2000 | Munakata | B01D 53/945 502/302 |
| 7,691,777 B2 * | 4/2010 | Isogai | B01D 53/945 502/324 |

(Continued)

FOREIGN PATENT DOCUMENTS

EP 3147262 A1 3/2017

OTHER PUBLICATIONS

Markova-Velichkova et al., "Complete oxidation of hydrocarbons on YFeO3 and LaFeO3 catalysts," Chemical Engineering Journal 231, 2013, pp. 236-244.

(Continued)

*Primary Examiner* — Timothy C Vanoy
(74) *Attorney, Agent, or Firm* — Christopher G. Darrow; Darrow Mustafa PC

(57) ABSTRACT

A catalyst system includes an oxygen storage and release material that has at least one compound of the structure $YMO_{3+\delta}$, where M is selected from Mn, Co, Cu, Ce, Ti, Ni, Zn, Fe and any combination thereof, and where $\delta$ is $\geq 0$. The oxygen storage and release material is configured to allow absorption and release oxygen depending on the conditions of a reagent stream such that sufficient oxygen is maintained for the catalytic removal of at least one of incompletely combusted hydrocarbons, CO, and NO. The catalyst system is useful in a catalytic converter such that oxygen is supplied under rich combustion conditions in an engine upstream of the catalytic converter inlet and oxygen is adsorbed and absorbed under lean rich combustion conditions in the engine.

13 Claims, 2 Drawing Sheets

(51) Int. Cl.
*B01J 23/42* (2006.01)
*B01J 23/44* (2006.01)
*B01J 23/46* (2006.01)
*B01D 53/94* (2006.01)
*F01N 3/08* (2006.01)
*F01N 3/28* (2006.01)

(52) U.S. Cl.
CPC ............. *B01J 23/44* (2013.01); *B01J 23/464* (2013.01); *F01N 3/0814* (2013.01); *F01N 3/0835* (2013.01); *F01N 3/0842* (2013.01); *F01N 3/0857* (2013.01); *F01N 3/28* (2013.01); *B01D 2255/1021* (2013.01); *B01D 2255/1023* (2013.01); *B01D 2255/1025* (2013.01); *B01D 2255/2073* (2013.01); *B01D 2255/908* (2013.01); *F01N 2370/02* (2013.01)

(58) Field of Classification Search
CPC ......... B01D 2255/908; B01D 2258/012; B01J 23/002; B01J 23/40; B01J 35/0006; F01N 3/101; F01N 2250/12; F01N 2570/16
See application file for complete search history.

(56) References Cited

U.S. PATENT DOCUMENTS

| | | |
|---|---|---|
| 9,764,985 B2 | 9/2017 | Dabrowski et al. |
| 2009/0264283 A1 | 10/2009 | Yang |
| 2016/0121309 A1* | 5/2016 | Nazarpoor ........... B01D 53/945 502/324 |

OTHER PUBLICATIONS

Buassi-Monroy et al., "Synthesis of crystalline YCoO3 perovskite via sol-gel method," Materials Letters 58, 5, 2004, pp. 716-718 (Abstract only).

Remsen S. et al., "Synthesis and Oxygen Storage Capacities of Hexagonal Dy1-xYxMnO3+o," Chem. Mater. 23, 2011, pp. 3818-3827.

Kurzman, J. et al., Pd2+/Pd0 Redox Cycling in Hexagonal YMn0.5Fe0.5O3: Implications for Catalysis by PGM-Substituted Complex Oxides, Inorg. Chem. 50, 2011, pp. 8073-8084 (Abstract only).

Motohashi, "Remarkable Oxygen Intake/Release Capability of BaYMn2O5+d," Chem. Mater., 22, 10, 2010, pp. 3192-3196 (Abstract only).

* cited by examiner

PEROVSKITES OXYGEN STORAGE AND RELEASE MATERIALS AND THEIR USE FOR EXHAUST GAS TREATMENT

CROSS REFERENCE TO RELATED APPLICATIONS

The application claims benefit of U.S. Provisional Application No. 62/969,463, filed on Feb. 3, 2020, which is herein incorporated by reference in its entirety.

TECHNICAL FIELD

The present disclosure generally relates to perovskite materials for oxygen storage, and more particularly, to reversibly storing and supplying oxygen to broaden the conditions under which components of an exhaust stream generated by an internal combustion engine, or the like, can be removed.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Automotive combustion relies heavily on engine tuning to balance three key combustion reactions and limit release of $NO_x$, CO, or hydrocarbons into the atmosphere. A three-way catalytic converter compensates for stoichiometric imbalances by oxidoreductive removal of pollutants from a combustion exhaust stream. These three reactions, in general form, are: oxidation of unburned hydrocarbons to carbon dioxide; oxidation of incompletely burned carbon monoxide to carbon dioxide; and reduction of oxides of nitrogen (principally $NO_2$ and NO) to nitrogen gas ($N_2$).

Three-way catalysts currently employ a support structure that is capable of storing oxygen for use when oxygen effluent in the exhaust stream is low. For more than three decades, zirconia stabilized ceria materials have been employed to absorb and release oxygen when the combustion reactions are outside the stoichiometric operating point. This oxygen storage technology allows a flexibility in engine operating conditions for a wide range of vehicle responsiveness and fuel economy while not emitting additional pollutants. State of the art materials have been adapted, modified, and engineered for further improvements.

While current catalysts exhibit promising features in terms of capacity, efficiency, and thermal stability, there is a constant need to find further improvements. An improved capability to reversibly store and release oxygen as the gas composition and temperatures fluctuate in the catalytic converter is desirable for reducing undesirable emissions. Accordingly, it is a goal to provide an oxygen storage component of high capacity and designed oxygen incorporation and release.

SUMMARY

This section provides a general summary of the disclosure, and is not a comprehensive disclosure of its full scope or all of its features.

In various aspects, the present teachings provide a catalyst system that stores and supplies oxygen for use in the removal of impurities, such as incompletely combusted hydrocarbons, CO and NO, from an exhaust gas stream. The catalyst system includes at least one oxygen storage and release material of the structure: $YMO_{3+\delta}$, that is configured for storage and release of oxygen to maintain sufficient oxygen for the catalytic removal of impurities, such as CO, where M is selected from the group consisting of Mn, Co, Cu, Ce, Ti, Ni, Zn, Fe and combinations thereof and where $\delta$ is $\geq 0$.

In other aspects, the present teachings a catalytic converter for removal of pollutants from an exhaust gas stream. The catalytic converter houses a catalyst system that includes at least one oxygen storage and release material of the structure: $YMO_{3+\delta}$ that is configured for the storage and release of oxygen to maintain sufficient oxygen for the catalytic removal of hydrocarbons, CO, and NO. M is selected from the group consisting of Mn, Co, Cu, Ce, Ti, Ni, Zn, Fe and combinations thereof and $\delta$ is $\geq 0$.

In still further aspects, the present teachings provide methods for storing and supplying oxygen for the removal of unoxidized or partially oxidized hydrocarbons, CO and NO from an exhaust gas stream. The exhaust gas flows through the catalyst system and contacts at least one metal catalyst dispersed on a surface of a support. The metal catalyst is within the catalyst system, which includes an oxygen storage and release material. The oxygen storage and release material includes at least one compound of the structure $YMO_{3+\delta}$, where M is selected from the group consisting of Mn, Co, Cu, Ce, Ti, Ni, Zn, Fe and combinations thereof and where $\delta$ is $\geq 0$.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
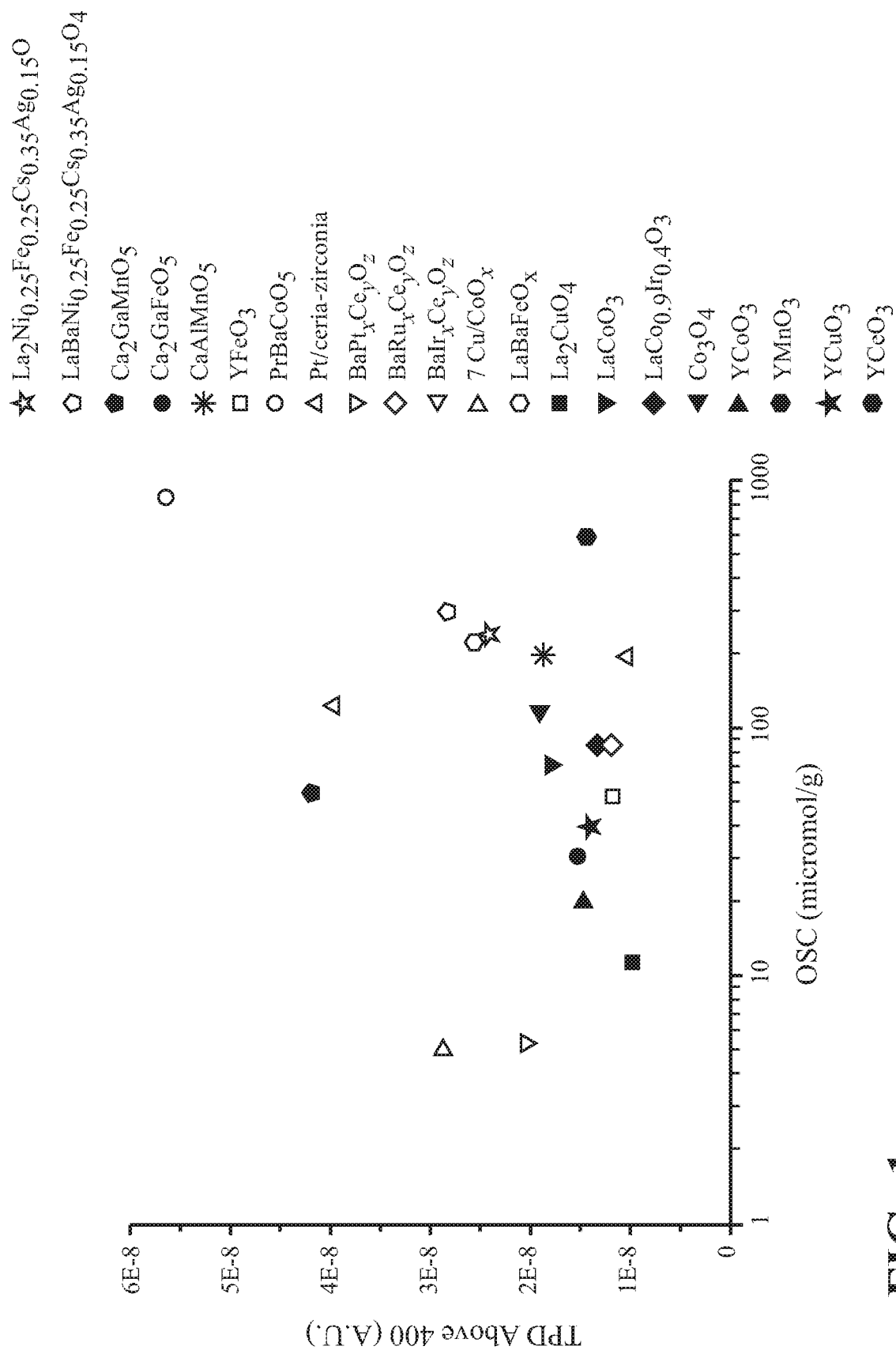
FIG. 1 illustrates the temperature program desorption (TPD) above 400° C. vs. the oxygen storage capacity OSC for various Perovskite compounds including some $YMO_{3+\delta}$, according to an embodiment of the invention.

It should be noted that the figure set forth herein is intended to exemplify the general characteristics of the methods, algorithms, and devices among those of the present technology, for the purpose of the description of certain aspects. The figure may not precisely reflect the characteristics of any given aspect, and are not necessarily intended to define or limit specific embodiments within the scope of this technology.

DETAILED DESCRIPTION

The present teachings provide a catalyst system including an oxygen storage and release material for the maintenances of sufficient oxygen content within a catalytic converter, where the oxygen storage material augments the oxygen content. The oxygen storage and release material releases oxygen under conditions that typically display insufficient oxygen to achieve the stoichiometry needed to decompose the impurities in an exhaust stream from an engine, and absorbs oxygen under conditions that the exhaust stream has an excess of oxygen to that required for reaction with the impurities.

In various embodiments, the oxygen storage and release material includes at least one compound of the structure $YMO_{3+\delta}$, where M is a transition metal selected from Mn, Co, Cu, Ce, Ti, Ni, Zn, Fe and a combination thereof. M can be a combination of the transition metals, and the oxygen storage and release material can be a combination of different $YMO_{3+\delta}$ compounds. The oxygen storage and release material can reside on a supporting structure in the form of nanoparticles, microparticles, or even larger particles or a continuous film, where the oxygen storage and release material can be of any porosity such that the available surface area is high overall, for example, but not limited to, a surface area equivalent to a film derived from non-porous particle of about 100 nm or less.

As detailed herein, the oxygen storage and release material may be employed in a catalyst system. The catalyst system is useful where the high surface area oxygen storage and release material is supported on one or more surfaces within a catalytic converter for vehicles, automobiles, and the like, where the catalyst system promotes a high extent of reaction for the removal of incompletely combusted hydrocarbons, either un-combusted or partially combusted hydrocarbons and undesirable partially oxidized products, such as CO and NO, within the exhaust stream. The catalytic system includes at least one metal, for example, platinum, palladium, and rhodium in forms typical of state of the art catalyst systems for catalytic converters. Advantageously, the oxygen storage and release material absorbs (chemisorbs) and adsorbs (physisorbs) oxygen when a vehicle engine is under lean fuel-to-air combustion conditions, where the oxygen levels are relatively high and the temperatures are relatively low in the exhaust stream. The oxygen storage and release material releases oxygen under when the vehicle engine is under rich fuel-to-air combustion conditions, where oxygen levels in the exhaust stream can be insufficient and the temperatures are relatively high. Under the rich conditions, the oxygen released from the oxygen storage material provides oxygen for meeting the required reagent stoichiometry at the active site of the catalyst when the available oxygen delivered in the inlet exhaust stream is insufficient. When employed in a catalyst system for a catalytic converter, the reversible oxygen storage and release compound undergoes a transformation of its structure between a first crystal phase conducive for oxygen absorption and a second crystal phase conducive for oxygen release.

Embodiments are also directed to a method of providing oxygen to an oxygen poor gas stream that can augment a deficiency in oxygen over a period of time. The method of providing oxygen is by including an oxygen storage and release material that includes one or more compounds of the structure $YMO_{3+\delta}$ into a chamber where the temperature fluctuates in response to a feed of a fuel to a combustion system. The $YMO_{3+\delta}$ has an M metal ion that is a transition metal that can vary in crystal phase where transformation of a first and at least a second crystal phase occurs reversibly, depending upon the composition and physical properties to which the compound is exposed. The transition metal can be any transition metal that can vary in coordination with oxygen anions depending upon temperature and oxygen concentration in its environment. In various aspects, the transition metal can be Mn, Co, Cu, Ce, Ti, Ni, Zn, Fe or any combination of the transition metals that displays a change in coordination with its environment but is not prone to non-reversible oxidation, such as often observed with iron. The method can be performed in any catalytic system including, but not limited to catalytic converters for vehicles, automobiles, and the like.

The oxygen storage and release material need not be of a single $YMO_{3+\delta}$ species, but can be an admixture of a plurality of different $YMO_{3+\delta}$ compounds having different transition metals, where the conditional regime for oxygen absorption and absorption and desorption varies such that in composite a larger window of temperatures and gas compositions are included. The oxygen storage and release material includes compounds that can vary in structure, for example, $YMnO_{3+\delta}$, which can vary between a hexagonal space group and a Perovskite space group. The compound can transform based on the environmental conditions of its environment.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction. In a catalytic conversion, the uptake and release of the oxygen must occur in an atmosphere that is rich in nitrogen, water vapor, and carbon dioxide.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Performance Evaluation

A plot of the temperature programmed desorption (TPD) vs the oxygen storage capacity of various $YMO_{3+\delta}$ compounds and other compositions is shown in FIG. 1 The oxygen storage capacity and desorption above 400° C. Hence, a moderate ($YCoO_3$ and $YCuO_3$) to high ($YCeO_3$ and $YMnO_3$) oxygen storage is observed with desorption being observed above 400° C.

Figure 2:
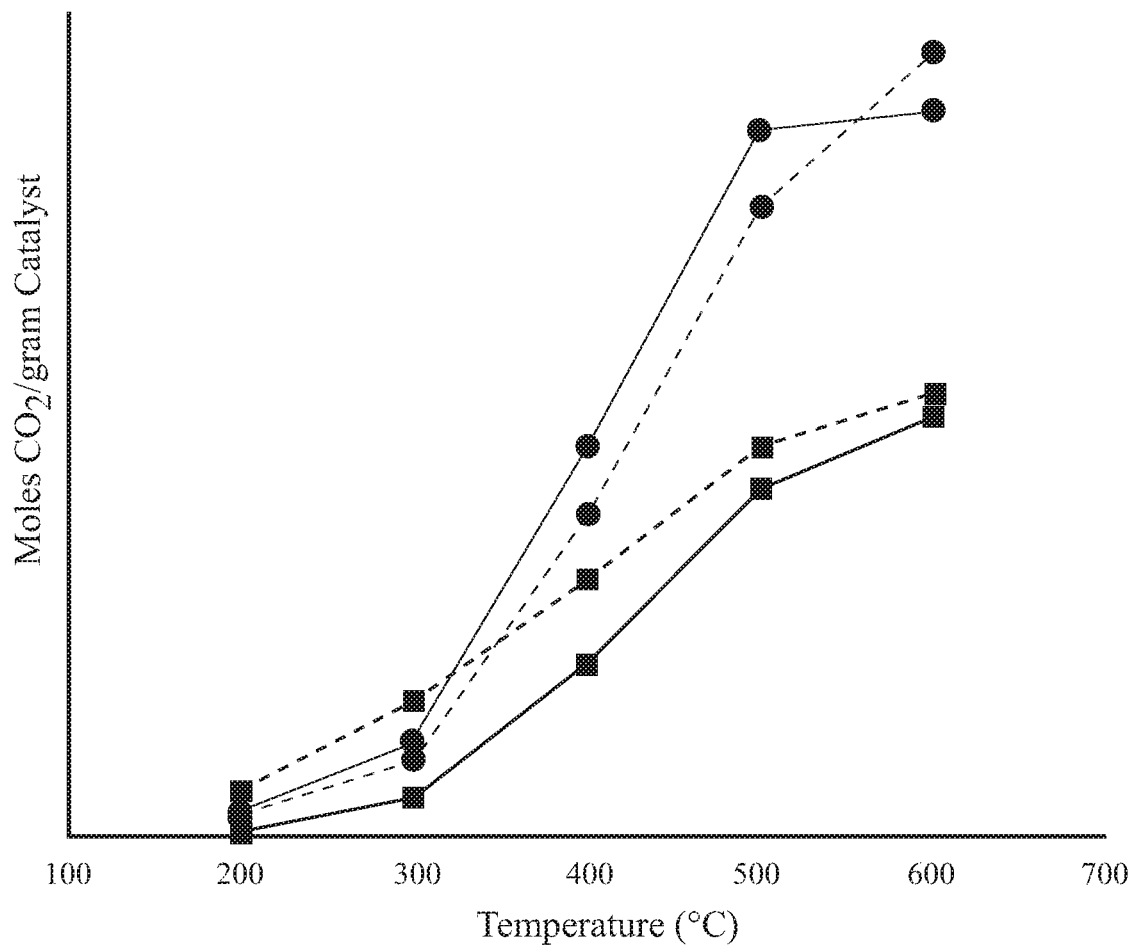
FIG. 2 shows a plot of molar oxygen storage per gram of $YMnO_3$ (circles) or a common production catalytic converter oxygen storage material (squares) before (broken line) or after (solid line) aging at 1,000° C. where the storage was enabled by flowing $O_2$ at a given temperature and removing $O_2$ by pulsing CO over the surface to produce $CO_2$.

The degree of oxygen storage particularly at temperatures in excess of about 300° C. for the oxygen storage and release material including at least compound of the structure $YMO_{3+\delta}$ is greater than a common state of the art oxygen storage and release material, as shown in FIG. 2, where the performance is comparable at temperatures lower than about 300° C., but is significantly greater, at higher temperatures, for example, at temperatures about 400° C. or greater. The robustness of the oxygen storage and release material is evident from the general retention of storage capacity after aging at 1,000° C.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalytic converter for removal of pollutants from an exhaust gas stream, the catalytic converter comprising:
    an inlet configured to receive the exhaust gas stream into an enclosure;
    an outlet configured to allow the exhaust gas stream to exit the enclosure; and
    a catalyst system contained inside the enclosure, the catalyst system comprising at least one metal catalyst and an oxygen storage and release material comprising at least compound of the structure $YMO_{3+\delta}$, where M is selected from the group consisting of Mn, Co, Cu, Ce, Ti, Ni, Zn, Fe and any combination thereof and where $\delta$ is $\geq 0$, and where the catalyst system is configured for selective absorption/adsorption and release of oxygen to promote sufficient oxygen for the catalytic removal of at least one of incompletely combusted hydrocarbons, CO, and NO.

2. The catalytic converter according to claim 1, wherein M is Mn.

3. The catalytic converter according to claim 1, wherein the $YMO_{3+\delta}$ is dispersed on a surface of a support within the catalytic converter.

4. The catalytic converter according to claim 1, wherein the metal catalyst comprises at least one metal from the group consisting of platinum, palladium, and rhodium.

5. A catalyst system contained inside an enclosure, the catalyst system comprising an oxygen storage and release material comprising at least one compound of the structure $YMO_{3+\delta}$, where M is selected from the group consisting of Mn, Co, Cu, Ce, Ti, Ni, Zn, Fe and any combination thereof, where $\delta$ is $\geq 0$, configured for selective absorption/adsorption and release of oxygen to promote sufficient oxygen for the catalytic removal of at least one of incompletely combusted hydrocarbons, CO, and $NO_x$ from a gas stream.

6. The catalyst system according to claim 5, wherein M is Mn.

7. A method for the removal of incompletely oxidized compounds from an exhaust gas stream, the method comprising:
    flowing the exhaust gas stream through a catalyst system and contacting the exhaust gas stream with at least one metal catalyst dispersed on a surface of a support, wherein the metal catalyst is within a catalyst system comprising an oxygen storage and release material for selectively storing oxygen and releasing oxygen, the oxygen storage and release material comprising at least one compound of the structure $YMO_{3+\delta}$, where M is selected from the group consisting of Mn, Co, Cu, Ce, Ti, Ni, Zn, Fe and any combination thereof and where $\delta$ is $\geq 0$, and wherein hydrocarbons, CO and NO are removed from the exhaust gas stream.

8. The method according to claim 7, wherein M is Mn.

9. The method according to claim 7, wherein the metal catalyst comprises at least one metal from the group consisting of platinum, palladium, and rhodium.

10. The method according to claim 7, wherein oxygen is released from the oxygen storage and release material when the exhaust gas stream flowing from an engine is reductive.

11. The method according to claim 7, wherein oxygen is absorbed/adsorbed into the oxygen storage and release material when the exhaust gas stream flowing from an engine is oxidative.

12. The method according to claim 7, wherein the storage and release of oxygen occurs over a temperature range of about 200° C. to about 650° C.

13. The method according to claim 7, wherein the storage and release of oxygen occurs over a temperature range of about 400° C. to about 650° C.

* * * * *